US009347798B1

(12) United States Patent
Johnson et al.

(10) Patent No.: US 9,347,798 B1
(45) Date of Patent: May 24, 2016

(54) METAL DETECTOR WITH HERMETIC HOUSING

(71) Applicants: Gerald L. Johnson, Garland, TX (US); Robert J. Podhrasky, Dallas, TX (US); Brent C. Weaver, Heath, TX (US)

(72) Inventors: Gerald L. Johnson, Garland, TX (US); Robert J. Podhrasky, Dallas, TX (US); Brent C. Weaver, Heath, TX (US)

(73) Assignee: Garrett Electronics, Inc., Garland, TX (US)

( * ) Notice: Subject to any disclaimer, the term of this patent is extended or adjusted under 35 U.S.C. 154(b) by 0 days.

(21) Appl. No.: 14/582,455

(22) Filed: Dec. 24, 2014

(51) Int. Cl.
G08B 3/00 (2006.01)
G08B 5/00 (2006.01)
G08B 7/00 (2006.01)
G01D 5/12 (2006.01)
H04R 1/02 (2006.01)

(52) U.S. Cl.
CPC . *G01D 5/12* (2013.01); *H04R 1/028* (2013.01)

(58) Field of Classification Search
CPC .................................. G01D 5/12; H04R 1/028
See application file for complete search history.

(56) References Cited

U.S. PATENT DOCUMENTS

| | | | |
|---|---|---|---|
| 3,316,545 A | 4/1967 | Reed | |
| 3,757,501 A | 9/1973 | Bennett, Jr. et al. | |
| 4,359,686 A | 11/1982 | Wherry | |
| 4,600,356 A | 7/1986 | Bridges et al. | |
| 4,622,766 A | 11/1986 | Hall | |
| 4,983,281 A | 1/1991 | Montelione | |
| 5,097,211 A | 3/1992 | Schonstedt | |
| 5,771,530 A | 6/1998 | Rodriquez | |
| 6,041,940 A | 3/2000 | Owings | |
| 6,957,506 B1 | 10/2005 | Fair | |
| 7,121,356 B2 | 10/2006 | Michael | |
| 7,575,065 B1 * | 8/2009 | Podhrasky | G01V 3/15 172/371 |
| 2006/0133633 A1 | 6/2006 | Hyvonen et al. | |
| 2006/0139156 A1 * | 6/2006 | Beverly | G08G 1/02 340/432 |
| 2010/0004718 A1 | 1/2010 | Doron et al. | |
| 2010/0321021 A1 | 12/2010 | Siegel | |
| 2013/0156218 A1 | 6/2013 | Annacone et al. | |
| 2013/0253387 A1 * | 9/2013 | Bonutti | A61H 23/0245 601/46 |
| 2014/0029782 A1 | 1/2014 | Rayner | |
| 2014/0361563 A1 | 12/2014 | Sickler, Jr. | |

OTHER PUBLICATIONS

International Search Report in PCT Patent Application Serial No. PCT/US15/66349 (Feb. 26, 2016).

* cited by examiner

*Primary Examiner* — Erin File
(74) *Attorney, Agent, or Firm* — Dan Brown Law Office; Daniel R. Brown

(57) ABSTRACT

A hermetically sealed metal detector includes a plastic housing with an integrally formed diaphragm having a predetermined area and a thickness that enables vibration thereof by an internal acoustic transducer. An alert signal audibly drives the transducer in response to a metal detector circuit. The acoustic transducer is positioned to align the transducer output port adjacent to the interior surface of the diaphragm, which enables coupling of the acoustic signal through an air gap to vibrate the diaphragm. A cover is disposed about the diaphragm on the exterior of the housing. The cover has a vent formed therethrough for enabling passage of the acoustic energy to the exterior of the housing. Light and battery hermetic sealing are also presented.

27 Claims, 5 Drawing Sheets

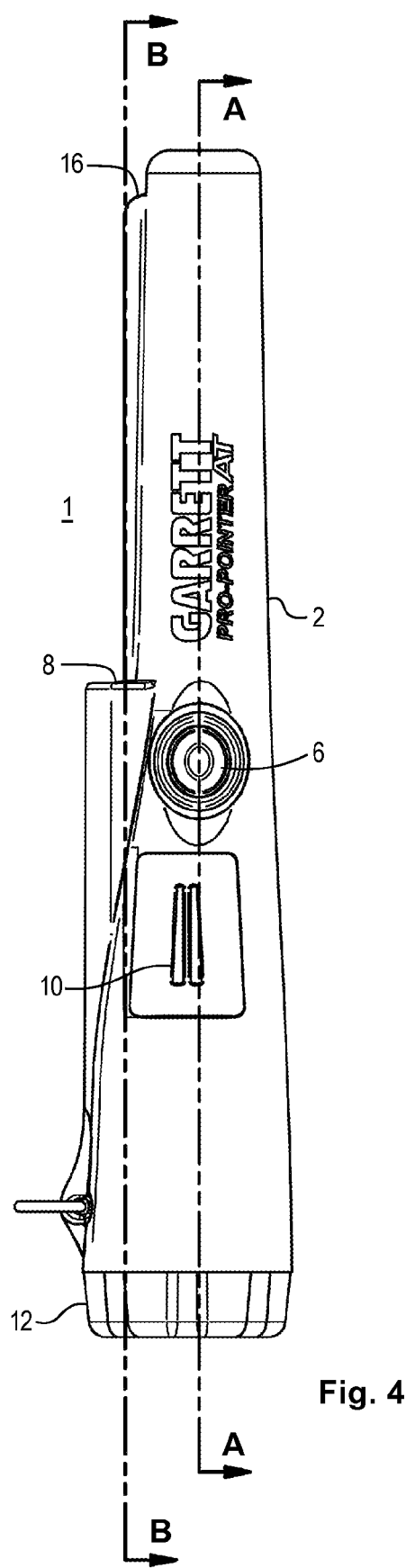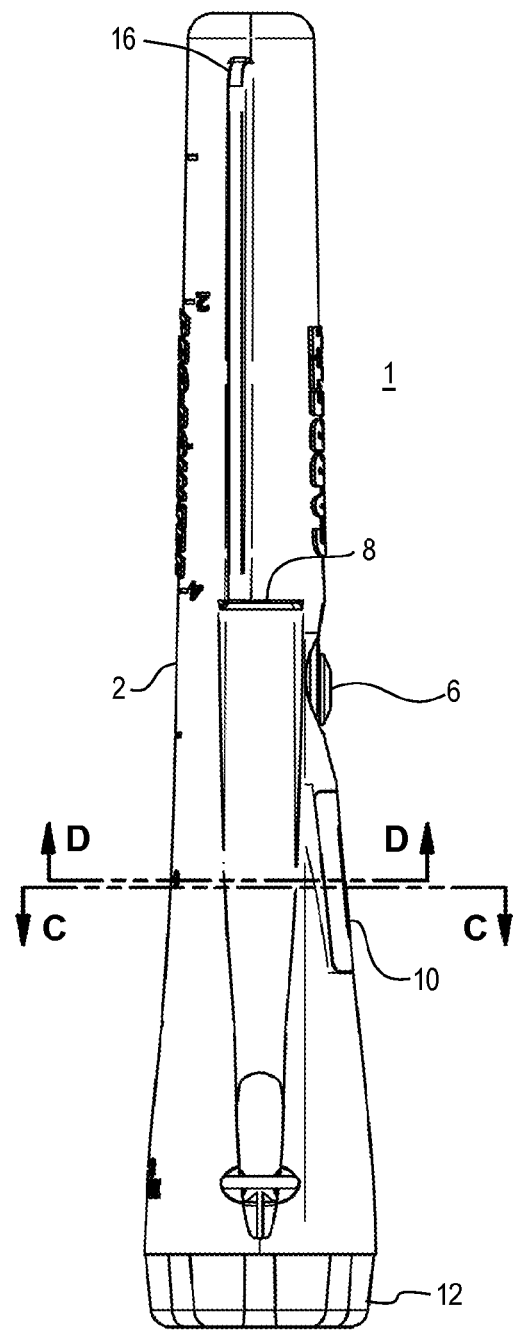
Fig. 4
Fig. 5

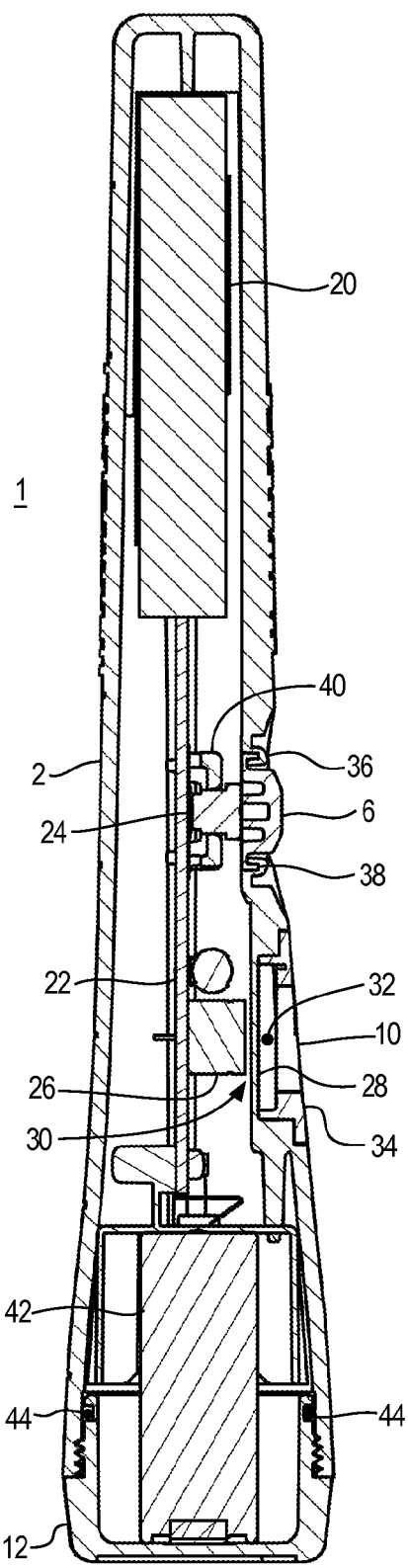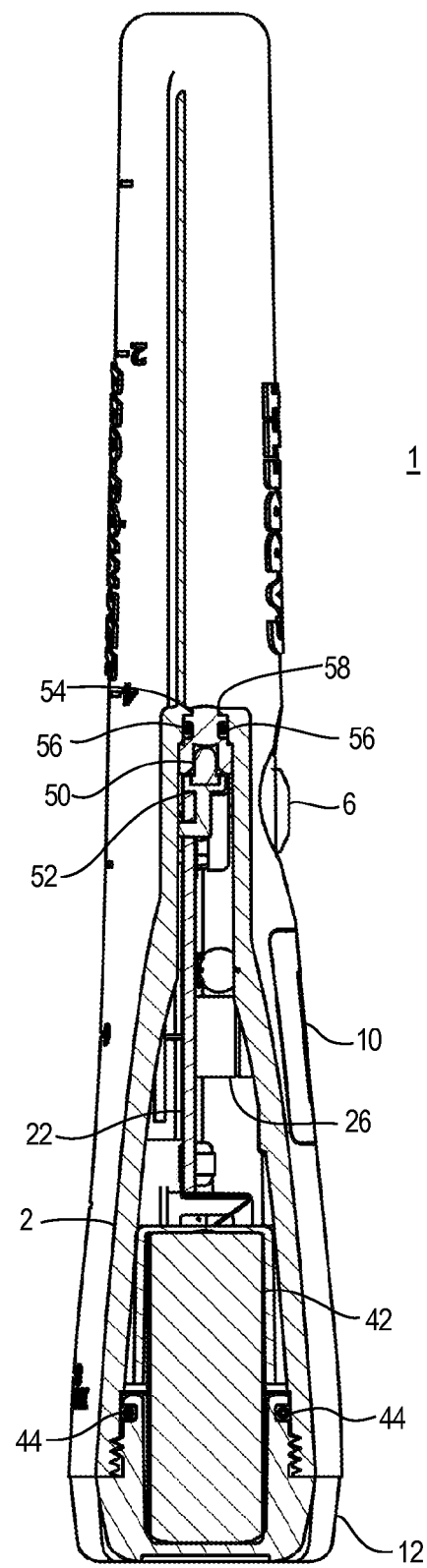
Section A-A
Fig. 6
Section B-B
Fig. 7

Section C-C

Section D-D

METAL DETECTOR WITH HERMETIC HOUSING

BACKGROUND OF THE INVENTION

1. Field of the Invention

The present invention relates to metal detectors. More specifically, the present invention relates to a hand-held metal detector having a hermetically sealed housing with visual, tactile and audible indicators.

2. Description of the Related Art

Metal detectors have been widely used for hobby, commercial, and security application for many decades. Current metal detectors consist of one or more search coils coupled to a detector circuit, which in turn, is connected to a user interface that reports the detection and presence of metallic objects to the operator. The search coil(s) establishes an electromagnetic field, called a search field, which can effectively penetrate non-metallic materials, such as soil, water and other materials. When the search field is moved into proximity of a metallic object, the search field is disturbed and the detector circuit senses this disturbance. Those skilled in the art are familiar with a number of field establishing and field disturbance detecting techniques, which can be used to estimate the size, location, and the content of the metallic objects in question.

A common application for metal detectors is treasure hunting by hobbyists. Desirable target metallic objects sought by hobbyists are coins, jewelry, artifacts, and other treasure, for example. Given a relatively large search area, such as a public park for example, operators will typically select a ground search metal detector that is effective for sweeping a large area with good search field penetration depth. Good penetration for small objects would be approximately six to twelve inches. A ground search metal detector typically employs a relatively large search coil (perhaps six to twelve inches in diameter) that is sequentially scanned back and forth, about one or two inches above the ground surface. To facilitate the user interface, a stem is usually employed to support the search coil and reach upwardly to a comfortable height for the operator to carry the metal detector while standing and scanning the ground. The stem also supports the detector circuit and user interface at a comfortable position, and may include various handles and arm rests for operator comfort. The detector circuit is generally in a housing and may include various interface components, such as a display, audible transducer, tactile transducer, visual transducer, and interface connectors, such as a headphone jack and power supply interface.

During a treasure hunt using a ground search metal detector, a fortunate hobbyist may receive an alert signal from the metal detector indicating that a metallic object has been located. The next step is to dig into the soil and retrieve the treasure. Thus, treasure hunting with a metal detector is a repetitive task, comprising searching and digging. As a practical matter, it is not necessarily easy to retrieve the metallic object discovered using a ground search metal detector. The operator is faced with the task of digging a six to twelve inch hole that is six to twelve inches deep for each alert that the metal detector provides. This issue has been greatly alleviated through use of a pinpointing metal detector, such as the Garrett Pro-Pointer model that is also the subject of U.S. Pat. Nos. D583,261 and 7,575,065, the contents of which are hereby incorporated by reference. The pinpointing metal detector is a hand-held unit having a handgrip portion and a probe portion that provides a compact search field, and that is particularly suited from locating a metallic object discovered in the larger search areas of a ground search metal detector.

In the process of searching for metallic objects it is common to encounter water, and also to conduct searches under water, such as under lakes, streams, puddles and so forth. Further it is not unusual to encounter water as a hole is dug to retrieve an object. In the case of a ground search metal detector, it is a fairly straightforward approach to make the search coil and stem waterproof, and also advise the user that the detector circuit and housing are to be kept away from water. In the case of a pinpointing metal detector, it is a more challenging design issue. The Garrett Pro-Pointer model actually includes an excavating blade on the detector, which encourages the user to dig and scrape with the metal detector within the search hole. When water is present, the issue of water intrusion into the metal detector housing is inevitable. Thus it can be appreciated that there is a need in the art for an apparatus to improve upon the waterproofing and protection of metal detector circuits and their related transducers and interfaces.

SUMMARY OF THE INVENTION

The need in the art is addressed by the apparatus of the present invention. The present invention teaches a hermetically sealed metal detector apparatus for locating metallic objects. The apparatus includes a housing that is formed from a thermoplastic material. The housing includes a diaphragm portion that is formed with the thermoplastic material on its exterior surface, which can vibrate at audible frequencies. A metal detector circuit is disposed within the housing, and generates a magnetic field through the housing. The metal detector circuit generates an alert signal while the magnetic field is positioned in proximity to a metallic object. An oscillator is provided, which produces an oscillating signal in response to the alert signal. An acoustic transducer is coupled to receive the oscillating signal and generate an acoustic signal through a transducer output port. The acoustic transducer is positioned to align the transducer output port adjacent to the interior surface of the diaphragm, thereby coupling the acoustic signal to vibrate the diaphragm, and thereby enabling the diaphragm to communicate acoustic energy to its exterior surface.

In a specific embodiment, the foregoing apparatus further includes a cover disposed about the diaphragm on the exterior of the housing. The cover has a vent formed therethrough for enabling passage of the acoustic energy to the exterior of the housing. In a refinement to this embodiment, the diaphragm is formed within a recess on the exterior of the housing, and the cover is fit about the recess to define an air chamber therebetween. In a further refinement, the cover has an exterior surface that generally follows the contours of the exterior of the housing.

In an additional refinement to the previous embodiment, the cover and the diaphragm define an air chamber for communicating the acoustic signal emitted from the vibrating diaphragm through the vent to the exterior of the hermetically sealed metal detector. In a refinement to this embodiment, a vent extension is disposed about the vent, which defines an acoustic path through the vent. In a particular refinement, the acoustic path has a length greater than 0.100 inches. In another particular refinement, the vent extension extends into the air chamber no closer than 0.050 inches from the exterior surface of the diaphragm.

In a specific embodiment of the foregoing apparatus, the acoustic transducer is separated from the interior of the diaphragm by an air gap that measures in the range from 0.001 inches and 0.100 inches. In another specific embodiment, the diaphragm is formed with a substantially planar configuration that is sufficiently thin to enable vibration thereof at audible frequencies.

In a specific embodiment of the foregoing apparatus, the diaphragm has surface area greater than 0.500 square inches, and the diaphragm has a thickness within the range of 0.023 inches to 0.039 inches. In another specific embodiment, the diaphragm is contiguously molded together with the housing.

In a specific embodiment of the foregoing apparatus, the oscillating signal is in the frequency range from 1000 to 3000 Hz. In another specific embodiment, the acoustic transducer is located a distance from the diaphragm that is substantially the same as the thickness of the diaphragm.

In a specific embodiment, the foregoing apparatus further includes a switch disposed within the interior of the housing, and a switch actuator disposed on the exterior of the housing that is aligned to engage and actuate the switch. The switch actuator is formed from an elastomeric polymer that is overmolded with the housing, thereby forming a hermetic seal about the switch actuator.

In a specific embodiment, the foregoing apparatus further includes a light emitting diode disposed in the interior of the housing, a light aperture formed through the housing, and a light pipe that is positioned through the light aperture, and oriented to conduct light from the light emitting diode to the exterior of the housing. An o-ring seal is placed between the light aperture and the light pipe, thereby providing a hermetic seal between the exterior and the interior of the housing.

The present invention also teaches a hermetically sealed metal detector apparatus for locating a metallic object. The apparatus includes a housing that is formed from a thermoplastic material. The housing includes a diaphragm that is formed with the thermoplastic material on the exterior surface thereof. The diaphragm has a substantially planar configuration with a predetermined surface area and a thickness that is less than one twentieth of the predetermined surface area, which enables vibration of the diaphragm at audible frequencies. A metal detector circuit is disposed within the housing, and generates a magnetic field through the housing. The metal detector circuit generates an alert signal while the magnetic field is positioned in proximity to a metallic object. An oscillator produces an oscillating signal in response to the alert signal. An acoustic transducer is coupled to receive the oscillating signal and generate an acoustic signal through a transducer output port. The acoustic transducer is positioned to align the transducer output port adjacent to the interior surface of the diaphragm, which enables coupling of the acoustic signal through an air gap to vibrate the diaphragm, and also enables the diaphragm to communicate acoustic energy to it exterior surface. A cover is disposed about the diaphragm on the exterior of the housing. The cover has a vent formed therethrough for enabling passage of the acoustic energy to the exterior of the housing.

In a specific embodiment of the foregoing apparatus, the thickness of the diaphragm is within the range of 0.023 inches to 0.039 inches. In another specific embodiment, the oscillating signal is in the range or 1700 to 2100 Hz.

In a specific embodiment of the foregoing apparatus, the acoustic transducer is located a distance from the diaphragm that is substantially the same as the thickness of the diaphragm. In another specific embodiment, the diaphragm is formed within a recess on the exterior of the housing, and the cover is fit about the recess to define an air chamber therebetween.

In a specific embodiment of the foregoing apparatus, the cover and the diaphragm define an air chamber for communicating the acoustic signal emitted from the vibrating diaphragm through the vent to the exterior of the environmentally sealed metal detector. In a refinement to this embodiment, the apparatus further includes a vent extension disposed about the vent, which defines an acoustic path through the vent. In a further refinement, the vent extension extends into the air chamber. In another refinement, the vent extension extends to within approximately one tenth of an inch from the exterior surface of the diaphragm.

In a specific embodiment of the foregoing apparatus, the vent has an area of approximately 0.100 square inches. In another specific embodiment, the area of the vent is approximately ten percent of the area of the diaphragm.

BRIEF DESCRIPTION OF THE DRAWINGS

FIG. 4 is a side view drawing of a metal detector referencing sectional views according to an illustrative embodiment of the present invention.

FIG. 5 is side view drawing of a metal detector referencing sectional views according to an illustrative embodiment of the present invention.

FIG. 6 is a longitudinal section view drawing of a metal detector according to an illustrative embodiment of the present invention.

FIG. 7 is a longitudinal section view drawing of a metal detector according to an illustrative embodiment of the present invention.

DESCRIPTION OF THE INVENTION

Figure 1:
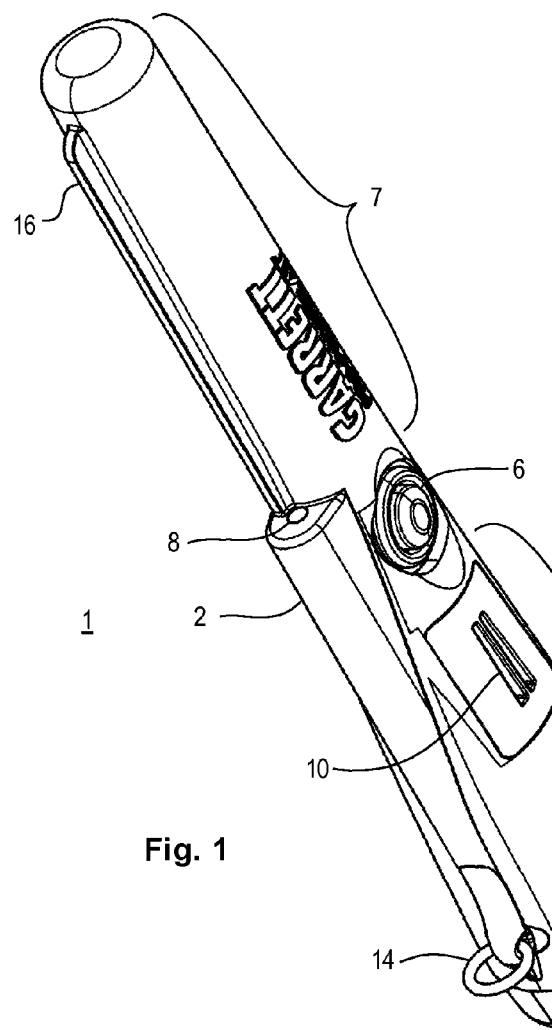
FIG. 1 is a perspective view drawing of a metal detector according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The problems in the art are addressed by the teachings presented herein. Various illustrative embodiments are described, and those of ordinary skill in the art will envision variants and modifications to the presented embodiments that are consistent with the claims appended hereto. One embodiment is a hand-held metal detector designed to precisely pinpoint metallic, both ferrous and nonferrous, objects sought during treasure recovery efforts. Although many other useful applications for metal detection exist as well. For example, the teachings provided herein are equally applicable to ground search type metal detectors. The hand-held metal detector embodiment is useful in conjunction with ground search metal detectors to aid in recovery of metallic targets and other metallic objects. The illustrative embodiment provides both audible and vibrating, or tactile, alarms to indicate the presence of metal objects. A sifting and scraping blade, which serves as an excavating tool, is disposed along the side of an elongated search probe portion of the detector. This arrangement encourages the operator to expose the entire unit to the ground, including soil, water, and other materials. In addition, a light emitting diode light is disposed on the detector housing and directed toward the search area to aid in low-light and no-light visibility. A prior art metal detector, the Garrett Electronics, Inc., Garland, Tex., Pro-Pointer model, which is described in U.S. Pat. No. 7,575,065 employed a water resistant design. For example, a gasket was placed between the LED and the aperture in the housing to resist water intrusion into the housing. Similarly, a water resistant fabric was place between the audio transducer and the acoustic port opening in the housing. While these approaches do resist the intrusion of water to a certain degree, operators desire further protection, including hermetic sealing so that the metal detector can even be operated in a submerged condition. The present invention addresses these needs.

Reference is directed to FIG. 1, which is a perspective view drawing of a metal detector 1 according to an illustrative embodiment of the present invention. The detector 1 is contained in a non-metallic housing 2 that consists of two primary portions, including a hand-grip portion 4 and an elongated probe portion 7. The hand-grip portion 4 is adapted for convenient hand holding, and includes a power and detection switch actuator 6 and an audio transducer vent 10. In addition a tactile, vibrating, transducer (not shown) is contained within the housing 2, and can be sensed by a user holding the hand-grip portion 4 during operation. A battery cover 12 threadably engages the hand-grip end of the housing 2, and provides access for installing and replacing a nine-volt battery that powers the detecting circuitry inside the housing 2. The battery cover 12 is hermetically sealed with an o-ring (not shown). A housing protrusion extends from the hand-grip portion 4, and supports an LED aperture 8 that is directed toward the metallic target search and excavation area during operation of the detector 1. The elongated probe portion 7 of the housing 2 has a tip end, which produces the highest sensitivity search field during operation of the detector 1. A sifting and scraping blade 16 is contiguously formed along a side of the elongated probe portion 7. An electromagnetic search coil (not shown) is disposed within the elongated probe portion 7, which generates an electromagnetic search field during operation. The search field is most sensitive at the tip end of the probe 7, but is also usefully sensitive along the side of the probe 7 in the area of the blade 16. A lanyard ring 14 is provided for retaining the metal detector 1 from a lanyard, which is useful while operating near water.

Figure 2:
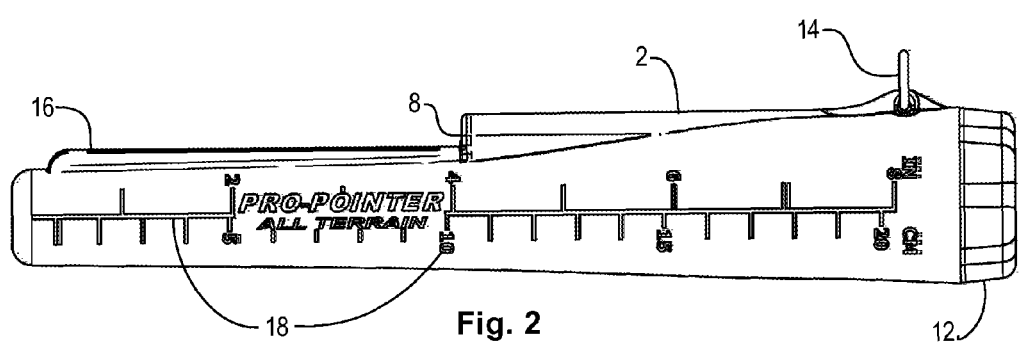
FIG. 2 is a side view drawing of a metal detector according to an illustrative embodiment of the present invention.

Reference is directed to FIG. 2, which is a side view drawing of a metal detector according to an illustrative embodiment of the present invention. The housing 2 is imprinted with a ruler 18 having both English and metric scales, which is useful in determining excavation depth. The battery cover 12, lanyard ring 14, scraper blade 16 and LED aperture 8 location are also presented in this view.

Figure 3:
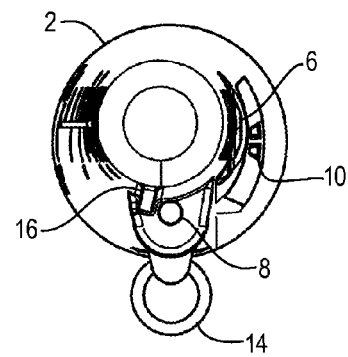
FIG. 3 is an end view drawing of a metal detector according to an illustrative embodiment of the present invention.

Reference is directed to FIG. 3, which is an end view drawing of a metal detector 1 according to an illustrative embodiment of the present invention. This is the tip end view of the housing 2. This view is useful for orienting the positions of the scraper blade 16, LED 8, switch actuator 6, acoustic vent 10, and lanyard ring 14.

Reference is directed to FIG. 4, which is a side view drawing of a metal detector 1 referencing sectional views A-A and B-B according to an illustrative embodiment of the present invention. The housing 2, battery cover 12, acoustic vent 10, switch actuator 6, LED aperture location 8, and scraper blade 16 are identified. Note that section line A-A lies along the switch actuator 6 and acoustic vent 10, and that section line B-B lies along the LED aperture location 8. The corresponding sectional views will provide details of the underlying structures.

Reference is directed to FIG. 5, which is side view drawing of a metal detector 1 referencing sectional views C-C and D-D according to an illustrative embodiment of the present invention. The housing 2, battery cover 12, acoustic vent 10, switch actuator 6, LED aperture location 8, and scraper blade 16 are identified. Note that section line C-C lies along the acoustic vent 10 looking toward the hand grip end, and that section line D-D also lies along the acoustic vent 10, looking toward the tip end of the housing 2. The corresponding sectional views will provide details of the underlying structures.

Reference is directed to FIG. 6, which is a longitudinal section view A-A drawing of a metal detector 1 according to an illustrative embodiment of the present invention. The housing 2 is injection molded from impact resistant ABS (acrylonitrile butadiene styrene) thermoplastic, however other thermoplastics may also be utilized depending on certain desirable characteristics. The housing 2 encloses and supports a number of internal components, including a ferrite rod and search coil 20, a battery 42, a detector printed circuit board 22 and other components discussed hereinafter. The battery 42 is retained by a battery cover 12, which is hermetically sealed by o-ring 44. This arrangement was also utilized in the prior art Garrett Pro-Pointer model.

A switch 24 is disposed on the surface of the printed circuit board 22, and is coupled through a switch linkage 40 to the switch actuator 6 in FIG. 6. The switch actuator 6 is molded from an elastomeric polymer, such as elastomeric urethane, which is over-molded with said housing 2, thereby forming a hermetic seal about said switch actuator 6. The over-molding engagement area 36/38 provides the hermetic sealing action. In another embodiment, an intermediate member (not shown) is disposed between, and over-molded with both, the housing 2 and the switch actuator 6. The intermediate member may be formed from polycarbonate or other material that is compatible for an over-molding engagement. In the illustrative embodiment, the switch 24 is a momentary contact switch closure coupled to a processor (not shown). The switch 24 rebounds, and the switch actuator 6 moves in concert therewith, while providing the desired resilience and imperviousness to moisture.

Figure 10:
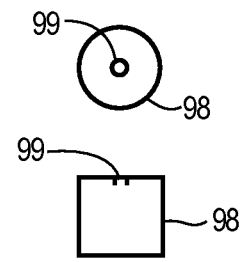
FIG. 10 comprises a side and end view drawing of an acoustic transducer according to an illustrative embodiment of the present invention.

Continuing in FIG. 6, an acoustic transducer 26 is mounted on the printed circuit board 22. The transducer 26 of the illustrative embodiment is a PUI Audio, Inc. model AT-1220-TT-R electro-mechanical transducer that is readily available from distributors such as Mouser Electronics, Mansfield, Tex. It is notable that the transducer 26 is provided with a 2.3 mm transducer port on its face, from which sound pressure waves emanate. This is useful in the illustrative embodiment for efficient coupling of the sound through the related structures. FIG. 10 of the drawings illustrates the physical arrangement of the acoustic transducer 26. In FIG. 10, the transducer is referenced with numeral 98 and the transducer port is referenced with numeral 99.

Continuing in FIG. 6, note that a diaphragm 28 is molded together with the housing 2, and is located directly adjacent to the acoustic transducer 26. They are separated by an air gap 30. The object of this arrangement is to couple the acoustic energy emitted from the transducer 26 to the diaphragm as efficiently as possible. In the illustrative embodiment, this is accomplished by forming a diaphragm that can readily vibrate at audible frequencies while maintaining a hermetically sealed housing, and by providing a narrow air gap 30, which effectively couples the acoustic energy emitted from the transducer 26 to the diaphragm 28, as well as selecting a frequency of operation for the audible tone that functions well with the other parameters. The illustrative embodiment transducer is manufacturer rated for operation at 2048 Hz, however, it has significant bandwidth so that it may be driven over a range of frequencies centered about that rated frequency. This range may extend from 1000 Hz to 3000 Hz. In the illustrative embodiment, an oscillator is facilitated using a processor (not shown) that outputs a digital wave that drives the transducer. The size and shape of the diaphragm were refined using empirical testing and housing size constraints, in combination with adjustments to the air gap 30 spacing and oscillator frequency to find a balance where maximum acoustic efficiency was achieved. The illustrative embodiment utilizes a diaphragm that has an area of approximately one square inch, and has a preferred thickness tolerance range of from 0.023 inches to 0.039 inches. Although diaphragm areas as small as one-half square inch are useful.

The air gap 30 in the illustrative embodiment of FIG. 6 is set to approximately equal the thickness of the diaphragm 28, which is a range from 0.023 inches to 0.039 inches, although, air gaps ranging from 0.001 inches to 0.100 inches may be useful. A limiting factor in a practical application, such as the illustrative embodiment, is the manufacturing tolerances of the assembled unit, which includes the precision of the injection molding, the size tolerance of the transducer, the tolerance of the printed circuit board, and the tolerances of the related guides and supporting structures. With this all in mind, a good target arrangement is a 1.050 square inch diaphragm 28 contiguously molded with the housing 2 from ABS plastic, a 0.025 inch thick diaphragm, a 0.025 inch air gap, and an operating frequency in the range from 1700 Hz to 2100 Hz, with the range from 1850 Hz to 1900 Hz showing to perform well with the samples tested. With this arrangement, efficient coupling of the audio from the transducer 26 to the vibrating diaphragm 28 was realized. The next design issue is efficient conversion of the energy from the vibrating diaphragm 28 to the exterior of the metal detector housing 2.

Continuing in FIG. 6, note that there is a recess formed in the housing about the area of the diaphragm 28, which establishes an air chamber 32 by virtue of the recess. The air chamber 32 is further enclosed by a cover 34 that has one or more vent openings 10 formed therethrough. This arrangement establishes a structure that efficiently couples the energy from the vibrating diaphragm 28 out the vent 10 openings to the exterior of the assembled housing 2. This arrangement is similar to the structure of a compression driver in a horn-loaded loudspeaker where the area of the driver is considerable larger than the area of the throat of the horn. By analogy, the area of the diaphragm 28 is considerably larger than the area of the vent opening 10. In the horn driver, the vibrating driver compresses the air and forces it through the throat to couple to the horn and provide the desired gain and directivity, as well as bandwidth, that a horn loaded loudspeaker provides. Theoretically speaking, this is related to a Helmholtz resonator. In the case of the illustrative embodiment, the analogy to the horn is limited because the design goal of the illustrative embodiment is for an efficient omni-directional acoustic radiator. However, qualitatively speaking, a Helmholtz resonator operates such that when air is forced into a cavity, the pressure inside increases. When the force pushing the air into the cavity is removed, such as reversal of the vibrating diaphragm, the higher pressure air inside will flow out. The cavity will be left at a pressure slightly lower than the outside, causing air to be drawn back in. This process repeats with the magnitude of the pressure changes decreasing each time. The air in the port (the vent opening) has mass. Since it is in motion, it possesses some momentum. A longer port would make for a larger mass, and vice-versa. The cross sectional area of the port is related to the mass of air and the volume of the chamber, as is the length of the vent passage. A port that is too small in area for the chamber volume will "choke" the flow, while one that is too large in area for the chamber volume tends to reduce the momentum of the air in the port, reducing efficiency. In the illustrative embodiment, the area of the vent opening 10 constitutes approximately 0.1 square inches, or approximately one tenth the area of the diaphragm 28.

Reference is directed to FIG. 7, which is a longitudinal section B-B view drawing of a metal detector 1 according to an illustrative embodiment of the present invention. This view is taken along the center of the LED 50, and presents the underlying structure for providing a hermetic seal of the light path. A number of components discussed in regards to the prior drawing figures are labeled in FIG. 7, and will not be repeatedly described in this paragraph. The LED 50 is supported from the printed circuit board 22 by bracket 52, which is configured to position the LED 50 in line with the light aperture 58. A light pipe 54 is inserted into the light aperture 58 and is sealed to the housing 2 with o-ring 56 to provide the hermetic seal. The LED 50 fits into a cavity in the back of the light pipe 54 so as to efficiently couple the light energy into the light pipe 54. The light pipe 54 is molded from a suitable transparent or translucent plastic, and may comprise arcuate surfaces to focus the emitted light as desired.

Figure 8:
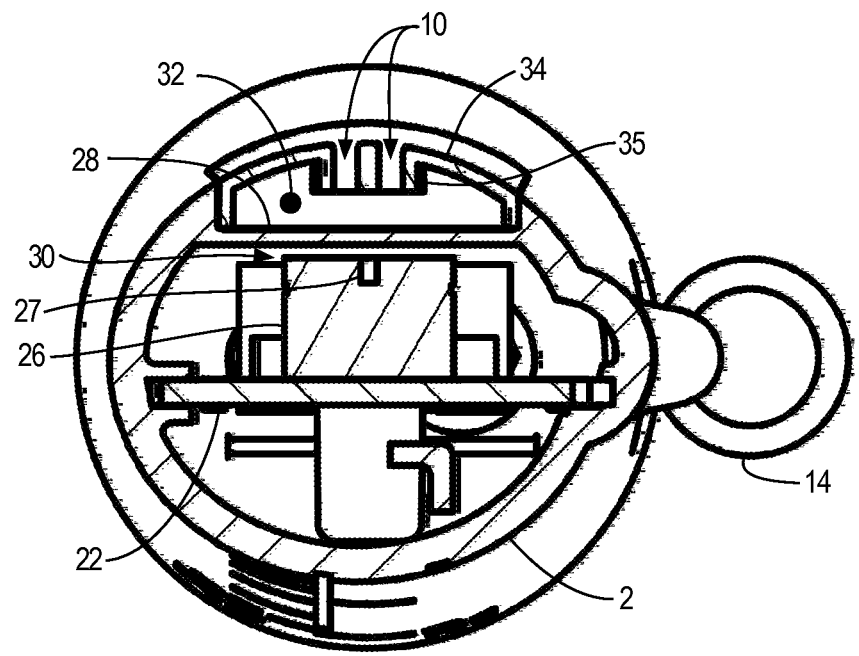
FIG. 8 is a lateral section view drawing of a metal detector according to an illustrative embodiment of the present invention.

Reference is directed to FIG. 8, which is a lateral section C-C view drawing of a metal detector according to an illustrative embodiment of the present invention. This view is taken at the location of the acoustic transducer 26, looking toward the handgrip end of the metal detector, where the lanyard ring 14 can be seen. The acoustic port 27 of the acoustic transducer 26 is indicated, which is the point from which sound pressure waves emanate from the transducer 26. The waves cross air gap 30 and impinge upon the diaphragm 28, thereby coupling energy and inducing vibration thereof. This can be considered a form of close coupling, as opposed to a form of resonant coupling. Note that resonant coupling is not realizable in a product with these dimensions since the wavelengths of sound are too long, both in the air medium and the thermoplastic medium for meaningful resonant coupling too occur. The air chamber 32 created between the recess in the housing 2 and the cover 34 is shown. Note that there are two vent openings 10 in the cover 34. An additional feature of the illustrative embodiment is the use of vent extensions 35, which increase the depth of the vents 10, and increase the volume of air in the port arrangement, which was discussed hereinbefore. In addition, the vent extensions also serve as stiffening ribs for the cover, so that the cover itself does not resonate as an opposing member. It is important that the cover is stiffer than the diaphragm. The vent extensions 35 have shown to increase acoustic efficiency in empirical testing, within some constraints. Note also that the vent extensions 35 provide additional structural support in the area of the vents 10 as well. While testing demonstrated that vent extensions improve acoustic efficiency, testing also demonstrated that reducing the gap between the interior end of the extensions 35 and the exterior surface of the diaphragm 28 to less than 0.050 inches had the opposite effect, and reduced acoustic efficiency. In the illustrative embodiment, a vent path of 0.100 inches that was at least 0.100 inches away from the diaphragm provided good efficiency.

Figure 9:
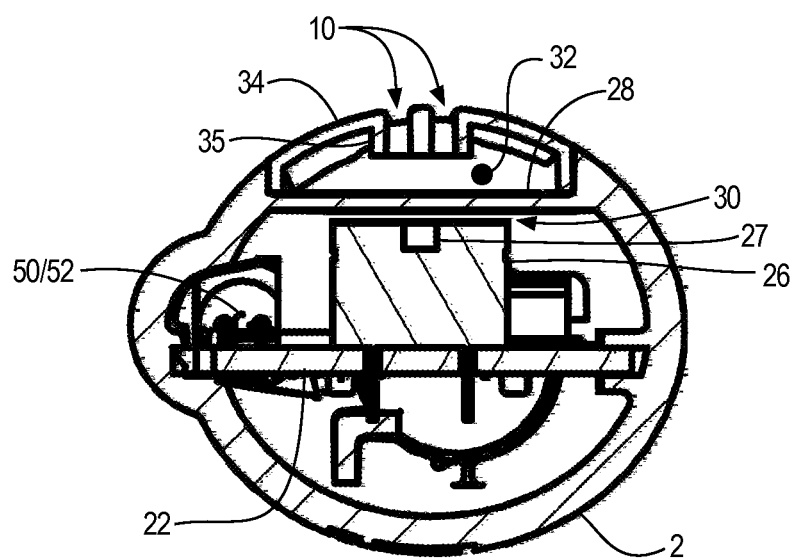
FIG. 9 is a lateral section view drawing of a metal detector according to an illustrative embodiment of the present invention.

Reference is directed to FIG. 9, which is a lateral section view D-D drawing of a metal detector according to an illustrative embodiment of the present invention. This view is taken at the location of the acoustic transducer 26, looking toward the tip end of the metal detector. A number of components discussed in regards to the prior drawing figures are labeled in FIG. 9, and will not be repeatedly described in this paragraph. Of note in this view is the relative location of the LED and LED support bracket 50/52 above printed circuit board 22, and the cross sectional form the thermoplastic housing 2 in the illustrative embodiment.

Figure 11:
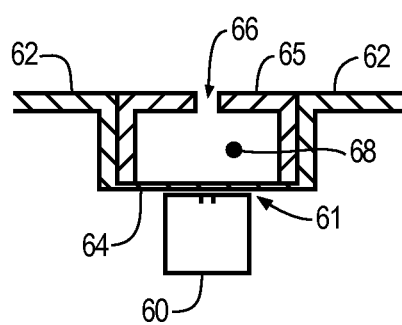
FIG. 11 is a section view drawing of a housing, diaphragm and cover assembly according to an illustrative embodiment of the present invention.

Reference is directed to FIG. 11, which is a section view drawing of a housing 62, diaphragm 64 and cover assembly 65 according to an illustrative embodiment of the present invention. This embodiment is a variation on the structure used to couple energy from an acoustic transducer 60 through an air gap 61 to excite a diaphragm 61. The vibrating diaphragm induces sound waves in an acoustic chamber 68, which drives vent opening 66 to couple the acoustic energy to the exterior of the housing 62. Note the physical configuration and connection between the cover 65 and the housing 62, and the lack of use of any vent extension.

Figure 12:
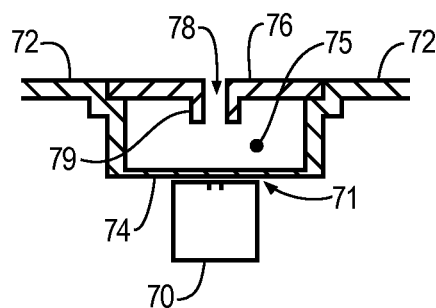
FIG. 12 is a section view drawing of a housing, diaphragm and cover assembly according to an illustrative embodiment of the present invention.

Reference is directed to FIG. 12, which is a section view drawing of a housing 72, diaphragm 74 and cover assembly 76 according to an illustrative embodiment of the present invention. This embodiment is a variation on the structure used to couple energy from an acoustic transducer 70 through an air gap 71 to excite a diaphragm 74. The vibrating diaphragm induces sound waves in an acoustic chamber 75, which drives vent opening 78 to couple the acoustic energy to the exterior of the housing 72. Note the physical configuration and connection between the cover 76 and the housing 72, and the use of a vent extension 79.

Figure 13:
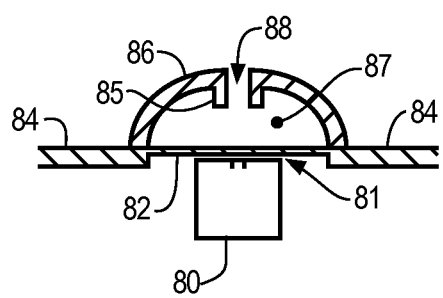
FIG. 13 is a section view drawing of a housing, diaphragm and cover assembly according to an illustrative embodiment of the present invention.

Reference is directed to FIG. 13, which is a section view drawing of a housing 84, diaphragm 82 and cover assembly 86 according to an illustrative embodiment of the present invention. This embodiment is a variation on the structure used to couple energy from an acoustic transducer 80 through an air gap 81 to excite a diaphragm 82. The vibrating diaphragm induces sound waves in an acoustic chamber 87, which drives vent opening 88 to couple the acoustic energy to the exterior of the housing 84. Note the physical configuration and connection between the cover 86 and the housing 84, and the use of a vent extension 85.

Figure 14:
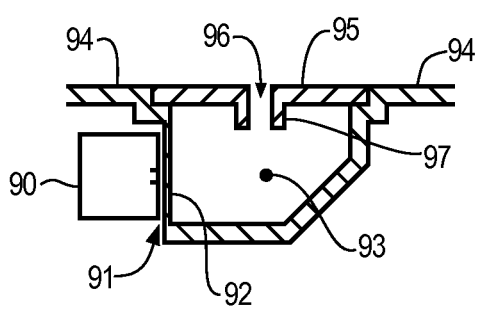
FIG. 14 is a section view drawing of a housing, diaphragm and cover assembly according to an illustrative embodiment of the present invention.

Reference is directed to FIG. 14, which is a section view drawing of a housing 94, diaphragm 92 and cover assembly 95 according to an illustrative embodiment of the present invention. This embodiment is a variation on the structure used to couple energy from an acoustic transducer 90 through an air gap 91 to excite a diaphragm 92. The vibrating diaphragm induces sound waves in an acoustic chamber 93, which drives vent opening 96 to couple the acoustic energy to the exterior of the housing 94. Note the physical configuration and connection between the cover 95 and the housing 94, and the use of a vent extension 97.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A hermetically sealed metal detector apparatus for locating a metallic object, comprising:
    a housing formed from a thermoplastic material;
    said housing having a diaphragm formed with said thermoplastic material on the exterior surface thereof, thereby enabling the vibration of said diaphragm at audible frequencies;
    a metal detector circuit disposed within said housing, which generates a magnetic field through said housing, and wherein said metal detector circuit generates an alert signal while said magnetic field is positioned in proximity to the metallic object;
    an oscillator that produces an oscillating signal in response to said alert signal;
    an acoustic transducer coupled to receive said oscillating signal and generate an acoustic signal through a transducer output port, and wherein
    said acoustic transducer is positioned to align said transducer output port adjacent to the interior surface of said diaphragm, thereby coupling said acoustic signal to vibrate said diaphragm, and thereby enabling said diaphragm to communicate acoustic energy to the exterior surface thereof.

2. The apparatus of claim 1, and further comprising:
a cover disposed about said diaphragm on the exterior of said housing, and having a vent formed therethrough for enabling passage of said acoustic energy to the exterior of said housing.

3. The apparatus of claim 2, and wherein:
said diaphragm is formed within a recess on the exterior of said housing, and wherein
said cover is fit about said recess to define an air chamber therebetween.

4. The apparatus of claim 3, and wherein:
said cover has an exterior surface that generally follows the contours of the exterior of said housing.

5. The apparatus of claim 2, and wherein
said cover and said diaphragm define an air chamber, for communicating said acoustic signal emitted from said vibrating diaphragm through said vent to the exterior of said hermetically sealed metal detector.

6. The apparatus of claim 5, further comprising:
a vent extension disposed about said vent, which defines an acoustic path through said vent.

7. The apparatus of claim 6, ad wherein:
said acoustic path has a length greater than 0.100 inches.

8. The apparatus of claim 7, and wherein:
said vent extension extends into said air chamber no closer than 0.050 inches from the exterior surface of said diaphragm.

9. The apparatus of claim 1, and wherein
said acoustic transducer is separated from the interior of said diaphragm by an air gap that measures in the range from 0.005 inches and 0.100 inches.

10. The apparatus of claim 1, and wherein:
said diaphragm is formed with a substantially planar configuration that is sufficiently thin to enable vibration thereof at audible frequencies.

11. The apparatus of claim 1, and wherein:
said diaphragm has surface area greater than 0.500 square inches, and wherein
said diaphragm has a thickness within the range of 0.023 inches to 0.039 inches.

12. The apparatus of claim 1, and wherein:
said diaphragm is contiguously molded together with said housing.

13. The apparatus of claim 1, and wherein:
said oscillating signal is in the frequency range from 1000 to 3000 Hz.

14. The apparatus of claim 1, and wherein:
said acoustic transducer is located a distance from said diaphragm that is substantially the same as said thickness of said diaphragm.

15. The apparatus of claim 1, further comprising:
a switch disposed within the interior of said housing;
a switch actuator disposed on the exterior of said housing and aligned to engage and actuate said switch, and wherein
said switch actuator is formed from a elastomeric polymer that is over-molded with said housing, thereby forming a hermetic seal about said switch actuator.

16. The apparatus of claim 1, further comprising:
a light emitting diode disposed in the interior of said housing;
a light aperture formed through said housing;
a light pipe disposed through said light aperture, and oriented to conduct light from said light emitting diode to the exterior of said housing, and an o-ring seal disposed between said light aperture and said light pipe, thereby providing a hermetic seal between the exterior and the interior of said housing.

17. A hermetically sealed metal detector apparatus for locating a metallic object, comprising:
a housing formed from a thermoplastic material;
said housing having a diaphragm formed with said thermoplastic material on the exterior surface thereof, said diaphragm having a substantially planar configuration with a predetermined surface area and a thickness that is less than one twentieth of said predetermined surface area, thereby enabling vibration thereof at audible frequencies;
a metal detector circuit disposed within said housing, which generates a magnetic field through said housing, and wherein said metal detector circuit generates an alert signal while said magnetic field is positioned in proximity to the metallic object;
an oscillator that produces an oscillating signal in response to said alert signal;
an acoustic transducer coupled to receive said oscillating signal and generate an acoustic signal through a transducer output port, and wherein
said acoustic transducer is positioned to align said transducer output port adjacent to the interior surface of said diaphragm, thereby coupling said acoustic signal through an air gap to vibrate said diaphragm, and thereby enabling said diaphragm to communicate acoustic energy to the exterior surface thereof;
a cover disposed about said diaphragm on the exterior of said housing, and having a vent formed therethrough for enabling passage of said acoustic energy to the exterior of said housing.

18. The apparatus of claim 17, and wherein:
said thickness of said diaphragm is within the range of 0.023 inches to 0.039 inches.

19. The apparatus of claim 17, and wherein:
said oscillating signal is in the range or 1700 to 2100 Hz.

20. The apparatus of claim 17, and wherein:
said acoustic transducer is located a distance from said diaphragm that is substantially the same as said thickness of said diaphragm.

21. The apparatus of claim 17, and wherein:
said diaphragm is formed within a recess on the exterior of said housing, and wherein
said cover is fit about said recess to define an air chamber therebetween.

22. The apparatus of claim 17, and wherein
said cover and said diaphragm define an air chamber, for communicating said acoustic signal emitted from said vibrating diaphragm through said vent to the exterior of said environmentally sealed metal detector.

23. The apparatus of claim 22, further comprising:
a vent extension disposed about said vent, which defines an acoustic path through said vent.

24. The apparatus of claim 23, and wherein:
said vent extension extends into said air chamber.

25. The apparatus of claim 24, and wherein:
said vent extension extends to within approximately one tenth of an inch from the exterior surface of said diaphragm.

26. The apparatus of claim 17, and wherein:
said vent has an area of approximately 0.100 square inches.

27. The apparatus of claim 17, and wherein:

the area of said vent is approximately ten percent of the area of said diaphragm.

\* \* \* \* \*